US008787585B2

(12) United States Patent
Brown

(10) Patent No.: US 8,787,585 B2
(45) Date of Patent: Jul. 22, 2014

(54) METHOD AND SYSTEM FOR FREQUENCY DOMAIN ACTIVE MATRIX DECODING WITHOUT FEEDBACK

(75) Inventor: C. Phillip Brown, Castro Valley, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 229 days.

(21) Appl. No.: 13/144,134

(22) PCT Filed: Jan. 12, 2010

(86) PCT No.: PCT/US2010/020700

§ 371 (c)(1),
(2), (4) Date: Jul. 12, 2011

(87) PCT Pub. No.: WO2010/083137

PCT Pub. Date: Jul. 22, 2010

(65) Prior Publication Data

US 2011/0274280 A1 Nov. 10, 2011

Related U.S. Application Data

(60) Provisional application No. 61/144,482, filed on Jan. 14, 2009.

(51) Int. Cl.

*H04R 5/00* (2006.01)
*H04R 5/02* (2006.01)
*H04B 15/00* (2006.01)
*H04S 3/02* (2006.01)
*H04S 5/00* (2006.01)

(52) U.S. Cl.

CPC ............... *H04S 3/02* (2013.01); *H04S 2420/07* (2013.01); *H04S 5/005* (2013.01)
USPC ................. 381/20; 381/22; 381/23; 381/300; 381/94.2

(58) Field of Classification Search

CPC ....... H04R 5/00; H04S 2420/07; H04S 5/005; G10L 19/00; G10L 19/24; G10L 21/038
USPC ................. 381/20, 1, 17, 18, 21, 22, 23, 300
See application file for complete search history.

(56) References Cited

U.S. PATENT DOCUMENTS 4,799,260 A * 1/1989 Mandell et al. ................. 381/22
5,046,098 A 9/1991 Mandell (Continued)

FOREIGN PATENT DOCUMENTS

CN 1571583 1/2005
JP 4540285 5/2003

(Continued)

OTHER PUBLICATIONS

Julstrom Stephen, "A High-Performance Surround Sound Process for Home Video" J. Audio Eng. Soc., vol. 35, No. 7/8, Jul./Aug. 1987.

(Continued)

*Primary Examiner* — Duc Nguyen
*Assistant Examiner* — Yogeshkumar Patel

(57) ABSTRACT

A perceptually motivated, frequency domain active matrix decoder and decoding method which decodes N audio input signals to generate M audio output signals, where M is greater than N, including by generating M streams of output frequency components which determine the audio output signals, in response to N streams of input frequency components indicative of the audio input signals, determining power ratios from the input frequency components without use of feedback, including at least one power ratio for each critical frequency band in a set of critical frequency bands, and determining gain control values for each of the critical frequency bands from the power ratios including by shaping the power ratios in nonlinear fashion without use of feedback. An active matrix element is steered using the gain control values.

19 Claims, 6 Drawing Sheets

LEFT/RIGHT CONTROL

(56) References Cited

U.S. PATENT DOCUMENTS

| | | | | |
|---|---|---|---|---|
| 5,400,433 | A | 3/1995 | Todd | |
| 5,862,228 | A | 1/1999 | Davis | |
| 5,870,480 | A | 2/1999 | Griesinger | |
| 6,021,386 | A | 2/2000 | Todd | |
| 6,920,223 | B1 | 7/2005 | Fosgate | |
| 6,970,567 | B1 | 11/2005 | Gundry | |
| 7,003,467 | B1 | 2/2006 | Smith | |
| 7,280,664 | B2 | 10/2007 | Fosgate | |
| 2007/0140499 | A1 * | 6/2007 | Davis | 381/23 |
| 2011/0119061 | A1 | 5/2011 | Brown | |
| 2011/0206223 | A1 * | 8/2011 | Ojala | 381/300 |

FOREIGN PATENT DOCUMENTS

| | | | |
|---|---|---|---|
| JP | 2005-229612 | 8/2005 | |
| JP | 2008-028693 | 2/2008 | |
| JP | 2008-522551 | 6/2008 | |
| JP | 5191886 | 11/2008 | |
| WO | 2006/060280 | 6/2006 | |
| WO | 2006/132857 | 12/2006 | |
| WO | WO 2010037427 A1 * | 4/2010 | G10L 19/008 |

OTHER PUBLICATIONS

Gundry Kenneth "A New Active Maxtrix Decoder for Surround Sound" Proc. AES 19th International Conference on Surround Sound, Jun. 2001.

Faller Christof, "Matrix Surround Revisited" AES 30th International Conference, Saariselka, Finland, Mar. 15-17, 2007, pp. 1-7.

Goodwin, et al., "Multichannel Surround Format Conversion and Generalized Upmix" Creative Advanced Technology Center, Scotts Valley, CA, AES 30th International Conference, Saariselka, Finland Mar. 15-17, 2007, pp. 1-9.

Bauer, et al., "Quadraphonic Matrix Perspective-Advances in SQ Encoding and Decoding Technology" Journal of the Audio Engineering Society, vol. 21, 9 pages, Jun. 1973.

Jot, et al., "Spatial Audio Scene Coding in a Universal Two-Channel 3-D Stereo Format" AES Convention Paper 7276 presented at the 123rd Convention, Oct. 5-8, 2007, New York, NY USA.

Gerzon Michael, "Surround-Sound Psychoacoustics" reproduced from Wireless World, Dec. 1974, pp. 483-485.

Dressler Roger, "Dolby Surround Pro Logic II Decoder Principles of Operation" published in 2000.

Preliminary Search Result conducted by Dolby Internal dated Jul. 22, 2008.

* cited by examiner

LEFT/RIGHT CONTROL

FRONT/BACK CONTROL

METHOD AND SYSTEM FOR FREQUENCY DOMAIN ACTIVE MATRIX DECODING WITHOUT FEEDBACK

CROSS-REFERENCE TO RELATED APPLICATIONS

This application claims priority to U.S. Patent Provisional Application No. 61/144,482, filed 14 Jan. 2009, hereby incorporated by reference in its entirety.

BACKGROUND OF THE INVENTION

1. Field of the Invention

The invention relates to active matrix decoder systems and methods for decoding a number of audio input signals (e.g., two input channels) into a greater number of audio output signals (e.g., five output channels, which may be full-frequency output channels). In some embodiments, the invention relates to such matrix decoder systems and methods which operate in the frequency domain, and in which an active matrix element is steered using gain control values generated without use of feedback.

2. Background of the Invention

Throughout this disclosure including in the claims, the terms “decoder” and “decoder system” are used synonymously.

Throughout this disclosure including in the claims, the expression performing an operation (e.g., filtering or transforming) “on” signals or data is used in a broad sense to denote performing the operation directly on the signals or data, or on processed versions of the signals or data (e.g., on versions of the signals that have undergone preliminary filtering prior to performance of the operation thereon).

Throughout this disclosure including in the claims, the expression “rear” location (e.g., “rear source location”) denotes a location behind a listener’s head, and the expression “front” location” (e.g., “front output location”) denotes a location in front of a listener’s head. Similarly, “front” speakers denotes speakers located in front of a listener’s head and “rear” speakers denotes speakers located behind a listener’s head.

Throughout this disclosure including in the claims, the expression “system” is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X-M inputs are received from an external source) may also be referred to as a decoder system.

Throughout this disclosure including in the claims, the expression “reproduction” of signals by speakers denotes causing the speakers to produce sound in response to the signals, including by performing any required amplification and/or other processing of the signals.

An audio matrix decoder functions to decode X discrete audio channels (determined by X input signals) into Y channels (determined by Y output signals) for playback, where X and Y are integers and Y is greater than X. The input channels are sometimes matrix encoded from a larger number of channels. Examples of matrix encoder/decoder technologies include Quadraphonic Stereo (described for example in Bauer, Benjamin B., et al. “Quadraphonic Matrix Perspective—Advances in SQ Encoding and Decoding Technology”, J. Audio Engineering Society., vol. 21, 9 pp., June 1973), Ambisonics (described, for example, in Michael Gerzon, “Surround-sound psychoacoustics, Criteria for the design of matrix and discrete surround-sound systems”, Wireless World, December 1974, pp. 483-485), the Dolby Pro Logic II technology (described for example by Kenneth Gundry, in the paper “A new active matrix decoder for surround sound”, Proc. AES 19th International Conference on Surround Sound, June 2001), and the Dolby Pro Logic technology.

FIG. 1 is an example of a simple, conventional 2-channel to 4-channel decoder of the type known as a passive matrix decoder. The passive matrix decoder does not attempt to analyze the input signals and instead makes assumptions regarding the input signals’ encoding (if any). In FIG. 1, input signals Left Total (Lt) and Right Total (Rt) are fed directly to a left (L) output and a right (R) output. A center (C) output is derived by summing input signals Lt and Rt in summation element 2 and asserting the resulting sum signal to amplifier 1 which applies a gain thereto. A surround (S) output is derived by generating the difference of input signals Lt and Rt in subtraction element 4 and low-pass filtering the resulting difference signal in low pass filter (LPF) 3.

FIG. 2 is an example of a conventional 2-channel to 5-channel decoder of the type known as an active matrix decoder. The decoder of FIG. 2 includes active decoding matrix 6. Matrix 6 is coupled to receive Left Total (Lt) and Right Total (Rt) input signals, and configured to generate five output signals (left output “L,” right output “R,” center output “C,” left surround output “Ls,” and right surround output “Rs” in response to the input signals and control signals from steering element 7. The active matrix decoder of FIG. 2 sums the input signals in summation element 2, and generates the difference of the input signals in subtraction element 4. The sum and difference signals output from elements 2 and 4 are not fed directly to the output channels (as in FIG. 1). Instead, the sum and difference signals output from elements 2 and 4 are asserted with input signals Lt and Rt to steering element 7. In response to these signals, steering element 7 analyzes the input signals in a way that allows it to continuously “steer” the decoding matrix 6. Active matrix 6 determines the output channel mixing based on the steering control signals asserted thereto from element 7.

It is well known how to implement active decoding in the time domain with a steering element that uses feedback to generate gain control signals for controlling an active matrix element. For example, U.S. Pat. No. 7,280,664 and U.S. Pat. No. 6,920,223, assigned to Dolby Laboratories Licensing Corporation, describe such decoding.

The active matrix decoder of U.S. Pat. No. 7,280,664 includes a steering element (e.g., element 230 of FIG. 16A) which includes servo circuitry which employs feedback to generate control signals for generating matrix coefficients to be applied by an active matrix element. For example, element 230 of FIG. 16A of U.S. Pat. No. 7,280,664 can include the servo circuitry of FIGS. 17-19 which uses feedback to generate control signals gL, gR, gF, gB, gLB, and gRB. These gain control signals are used to generate updated matrix coefficients to be applied by adaptive matrix 214 of FIG. 16A. For example, the servo circuitry of FIG. 17 generates control signals gL and gR in response to audio signal samples Lt' and Rt' including by asserting the signals gL and gR as feedback to the inputs Lt' and Rt' (and combining the signals gL and gR with the inputs Lt' and Rt' respectively, in elements 242, 240, 252, and 250). The outputs of elements 240 and 250, which are (1-gL)Lt' and (1-gR)Rt' respectively, are used to update the value of control signal LR. The updated value of signal LR determines updated values of the control signals gL and gR.

It is also known to implement active decoding in the time domain with a steering element that does not use feedback to generate gain control signals for controlling an active matrix element. Such an active decoder is described, for example, in U.S. Pat. No. 4,799,260, assigned to Dolby Laboratories Licensing Corporation. However, the active matrix decoding described in U.S. Pat. No. 4,799,260 is performed without determining (in accordance with perceptually motivated considerations) critical frequency bands of the input audio signals' full frequency range. The active matrix decoding described in U.S. Pat. No. 4,799,260 is also performed without generating gain control values for different ones of such critical frequency bands, and without filtering the input audio signals to generate input subband signals each in a different critical frequency band or implementing a different active matrix for each of multiple critical frequency bands.

The expression "critical frequency bands" (of a full frequency range of a set of one or more audio signals) herein denotes frequency bands of the full frequency range that are determined in accordance with perceptually motivated considerations. Typically, critical frequency bands that partition the full audible frequency range have width that increases with frequency across the full audible frequency range.

It has been suggested to perform active matrix decoding in the time domain with generation of gain control values for different ones of multiple critical frequency bands of input audio signals. For example, U.S. Pat. No. 7,003,467, which indicates on its face that it is assigned to Digital Theater Systems, Inc., teaches an active matrix decoder implemented in the time domain. The decoder applies bandpass filters to audio input signals to generate a set of input subband signals, each indicative of a different frequency band of the full frequency range of the input signals, and then decodes the subband signals. U.S. Pat. No. 7,003,467 teaches that the subband signals can be combined into a smaller number of grouped signals, each indicative of a different critical frequency band (of a type known as a "bark band") of the full frequency range of the input signals, and the grouped signals can then be decoded. However, U.S. Pat. No. 7,003,467 does not teach (and it had not been known until the present invention) how to implement active decoding in the frequency domain including by filtering input audio signals to generate input subband signals each in a different critical frequency band, generating gain control values independently for each of the critical frequency bands, and applying a different active matrix to each of the input subband signals. Nor does U.S. Pat. No. 7,003,467 suggest that active audio signal decoding should be implemented in the frequency domain, or how to implement such frequency domain active decoding in an efficient manner (e.g., with low processor speed (e.g., low MIPS) requirements).

There is a need for an active matrix decoder which decodes different critical frequency bands of input audio signals in a manner tailored to the input audio content in each critical frequency band (including by generating gain control values for decoding different critical frequency bands of the input audio) to achieve improved sonic performance in an efficient manner, and in a manner implementable with low processor speed (e.g., low MIPS) requirements. Typical embodiments of the present invention achieve improved sonic performance (including greater frequency selectivity without perceptual artifacts) with reduced computational requirements by decoding different critical frequency bands of frequency domain input audio in a manner tailored to the input audio content in each critical frequency band (including by generating gain control values for decoding different critical frequency bands of the input audio).

Until the present invention it had not been known how to implement a perceptually motivated audio matrix decoder that converts N (e.g., N=2) audio input channels into M (where M is greater than N) full-frequency audio output channels, including by transforming the input signals into the frequency domain (when the input signals are not already in the frequency domain), asserting the resulting input frequency components to an active matrix element which generates M output streams of frequency components in response thereto, and steering the active matrix element without use of feedback. Nor had been known how to implement such steering with a criterion for the steering determined using power ratios (generated from the frequency domain input audio for each critical frequency band in a set of critical frequency bands), including by shaping in nonlinear fashion and scaling the power ratios.

BRIEF DESCRIPTION OF THE INVENTION

In a class of embodiments, the invention is a perceptually motivated active matrix decoder configured to decode N streams of input frequency components indicative of N audio input signals (input channels) to generate M streams of output frequency components which determine M audio output signals (typically, full-frequency output channels), where M and N are integers and M is greater than N. The decoder includes an active matrix subsystem configured to generate M streams of output frequency components which determine the M audio output signals, in response to N streams of input frequency components (indicative of the N audio input signals); and a control subsystem coupled to the active matrix subsystem and configured to generate gain control values in response to the input frequency components without use of feedback and to assert the gain control values to the active matrix subsystem for steering the active matrix element during generation of the output frequency components. The control subsystem is configured to generate power ratios in response to the input frequency components, said power ratios including at least one power ratio (for each block of the input frequency components) for each critical frequency band in a set of critical frequency bands, and to generate the gain control values in response to the power ratios including by shaping the power ratios in nonlinear fashion (and optionally scaling and smoothing the power ratios).

Typically, the active matrix subsystem applies multiple sets of matrix coefficients, each set of matrix coefficients for a different one of the critical frequency bands. For example, in some embodiments the gain control values for each critical frequency band determine a different set of matrix coefficients for application by the active matrix subsystem to input frequency components whose transform frequency bins are within the critical frequency band. The input frequency components (of each block of the input frequency components) in each transform frequency bin that belongs to one of the critical frequency bands are matrix multiplied by the matrix coefficients for the critical frequency band corresponding to that critical frequency band.

In some embodiments, the decoder also includes an input transform subsystem configured to transform the N input signals from the time domain to the frequency domain, thereby generating the N streams of input frequency components in response to the N input signals. In some embodiments, the decoder also includes an output transform subsystem configured to transform the streams of output frequency components from the frequency domain into the time domain, thereby generating the M output signals in response to said output frequency components. Typically, N=2, and M=5. Also typically, the control subsystem is configured to generate (for each block of the input frequency coefficients) a pair of power ratios for each critical frequency band in the set of critical frequency bands, and to generate (for each block of the input frequency coefficients) five gain control values for each said critical frequency band from the power ratios. For example, in some embodiments in which the decoder is configured to decode two audio input signals to generate five audio output signals (a left channel output signal, a right channel output signal, a center channel output signal, a right surround channel output signal, and a left surround channel output signal), each pair of power ratios comprises: a ratio of left and right channel power measurements, and a ratio of front and back channel power measurements. Preferably, the critical frequency bands divide the steering into frequency regions that are based on psychoacoustics.

In a class of embodiments, the invention is a matrix decoding method for decoding N audio input signals to determine M audio output signals (typically, full-frequency output channels), where M and N are integers and M is greater than N, said method including the steps of:

(a) operating an active matrix subsystem to generate M streams of output frequency components which determine the M audio output signals, in response to N streams of input frequency components indicative of the N audio input signals;

(b) determining power ratios from the input frequency components without use of feedback, said power ratios including at least one power ratio for each critical frequency band in a set of critical frequency bands;

(c) determining gain control values for each of the critical frequency bands from the power ratios including by shaping the power ratios in nonlinear fashion without use of feedback; and (d) while performing step (a), steering the active matrix element using the gain control values.

In some embodiments, step (c) includes the step of scaling and smoothing the power ratios without use of feedback. Typically, N=2, M=5, step (b) includes the step of determining two power ratios (for each block of the input frequency coefficients) for each of the critical frequency bands, and step (c) includes the step of determining five gain control values (for each block of the input frequency coefficients) for each of the critical frequency bands. In some embodiments, the method also includes at least one of the steps of: transforming the audio input signals from the time domain into the frequency domain to generate the streams of input frequency components; and transforming the streams of output frequency components from the frequency domain into the time domain, thereby generating the M audio output signals.

In typical embodiments, the inventive decoder is or includes a general or special purpose processor programmed with software (or firmware) and/or otherwise configured to perform an embodiment of the inventive method. In some embodiments, the inventive decoder is a general purpose processor, coupled to receive input data indicative of the audio input signals and programmed (with appropriate software) to generate output data indicative of the audio output signals in response to the input data by performing an embodiment of the inventive method. In other embodiments, the inventive decoder is implemented by appropriately configuring (e.g., by programming) a configurable audio digital signal processor (DSP). The audio DSP can be a conventional audio DSP that is configurable (e.g., programmable by appropriate software or firmware, or otherwise configurable in response to control data) to perform any of a variety of operations on input audio. In operation, an audio DSP that has been configured to perform active matrix decoding in accordance with the invention is coupled to receive multiple audio input signals, and the DSP typically performs a variety of operations on the input audio in addition to (as well as) decoding. In accordance with various embodiments of the invention, an audio DSP is operable to perform an embodiment of the inventive method after being configured (e.g., programmed) to generate output audio signals in response to the input audio signals by performing the method on the input audio signals. Aspects of the invention include a system configured (e.g., programmed) to perform any embodiment of the inventive method, and a computer readable medium (e.g., a disc) which stores code for implementing any embodiment of the inventive method.

DETAILED DESCRIPTION OF THE PREFERRED EMBODIMENTS

Many embodiments of the present invention are technologically possible. It will be apparent to those of ordinary skill in the art from the present disclosure how to implement them. Embodiments of the inventive system, method, and medium will be described with reference to FIGS. 3-9.

Figure 1:
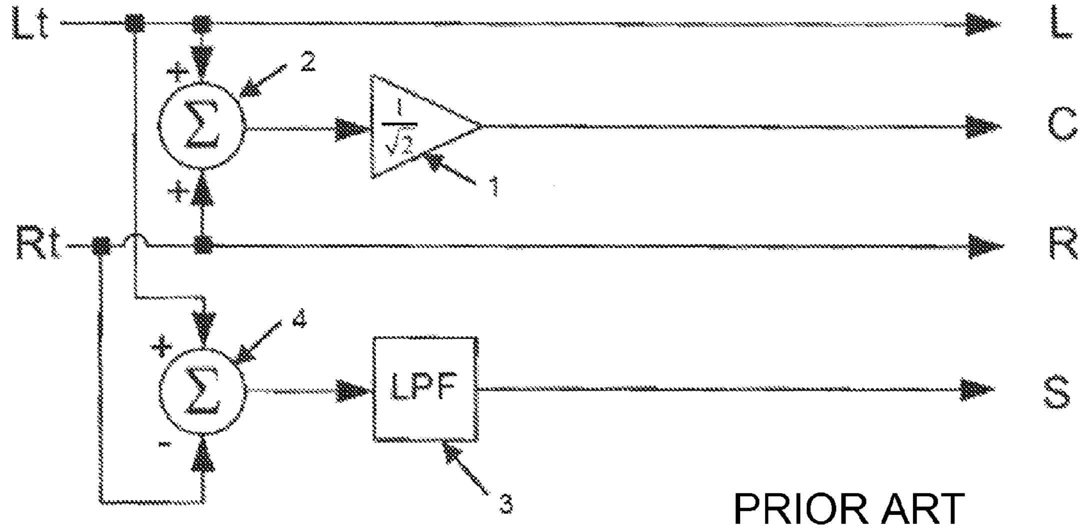
FIG. 1 is a block diagram of a conventional audio matrix decoder.
Figure 2:
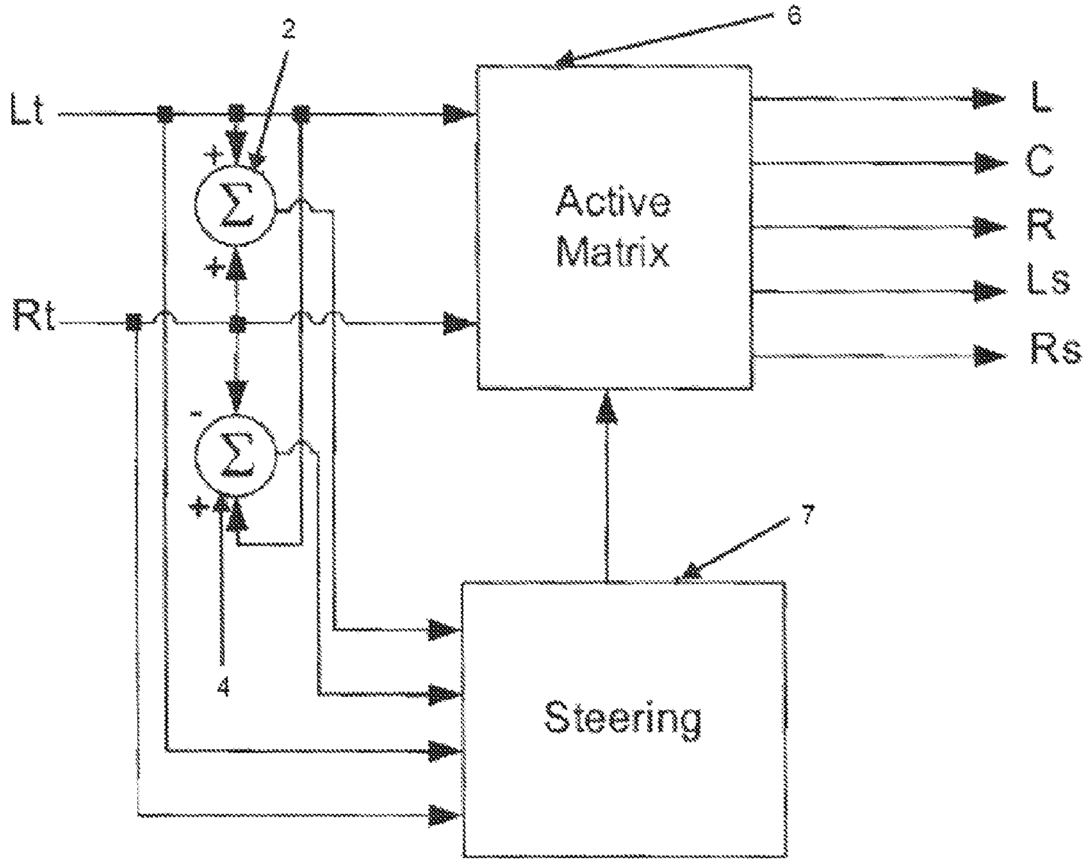
FIG. 2 PRIOR ART
FIG. 2 is a block diagram of another conventional audio matrix decoder.
Figure 3:
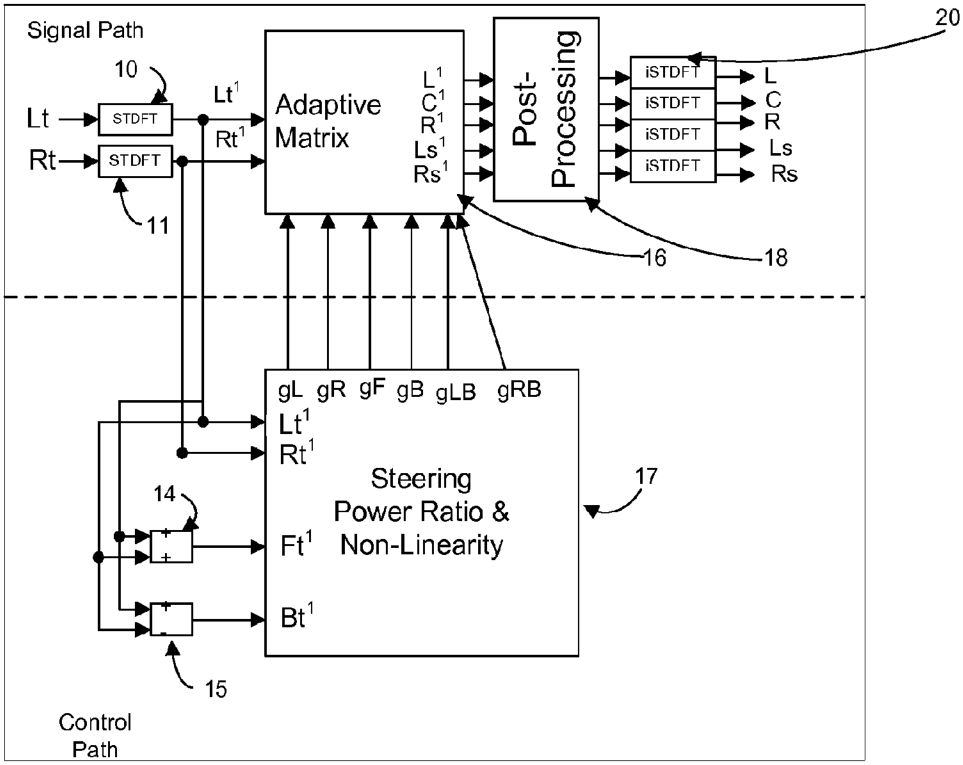
FIG. 3 is a block diagram of an embodiment of the inventive active matrix decoder system.

FIG. 3 is a block diagram of an embodiment of the inventive active matrix decoder system. The FIG. 3 system includes time domain-to-frequency domain transform stage 10 coupled and configured to receive time-domain input signal “Left Total” (Lt) and to generate frequency components Lt' by performing a time-to-frequency domain transform (e.g., a Discrete Fourier transform, but alternatively a Modified Discrete Cosine Transform, or a transform in a Quadrature Minor Filterbank, or another time domain-to-frequency domain transform) on input signal Lt. The frequency components Lt' include subsets, each in a different frequency bin (frequency transform bin). The FIG. 3 system also includes time domain-to-frequency domain transform stage 11 coupled and configured to receive time-domain input signal “Right Total” (Rt) and to generate frequency components Rt' by performing a time-to-frequency domain transform (e.g., a Discrete Fourier transform, but alternatively a Modified Discrete Cosine Transform, or a transform in a Quadrature Mirror Filterbank, or another time domain-to-frequency domain transform) on input signal Rt. The frequency components Rt' include subsets, each in a different frequency bin (frequency transform bin). The frequency components Lt' and Rt' in each frequency bin are separately analyzed and processed in adaptive decoding matrix 16 and steering element 17.

Active (adaptive) decoding matrix 16 is configured to generate five sequences of output frequency components, identified in FIG. 3 as left output data L' (indicative of sound from a left front source), right output data R' (indicative of sound from a right front source), center output data C' (indicative of sound from a center front source), left surround output data Ls' (indicative of sound from a left rear source), and right surround output data Rs' (indicative of sound from a right rear source), in response to control signals from steering element 17 and the input frequency components Lt' and Rt'.

Each frequency component Lt' is summed with a corresponding frequency component Rt' in summation element 14, to generate a sequence of frequency components Ft' (referred to herein as "front channel" frequency components). Each frequency component Rt' is subtracted from a corresponding frequency component Lt' in subtraction element 14 to generate a sequence of frequency components Bt' (referred to herein as "back channel" frequency components). Frequency components Lt' and Rt' can undergo simple processing to indicate signal dominance along the left-to-right axis, and are used by steering element 17 to generate a sequence of power ratio values which determine gain control values gL and gR. Frequency components Ft' and Bt' can undergo simple processing to indicate signal dominance along the front-to-back axis (perpendicular to the left-to-right axis) and are used by steering element 17 to generate a sequence of power ratio values which determine gain control values gF and gB. When the input audio signals are indicative of sound (in a critical frequency band) predominantly from one source direction (e.g., left front), steering element generates a different set of gain control values (for the critical frequency band) than when they are indicative of sound (in the critical frequency band) predominantly from another source direction (e.g., right rear).

Frequency components Ft' and Bt' and frequency components Lt' and Rt' are asserted to steering element 17. In response, steering element 17 analyzes the frequency components Lt' and Rt' in each critical frequency band to generate (and assert to adaptive decoding matrix 16) gain control values gL, gR, gF, gB, gLB, and gRB for configuring matrix 16 for each of the critical frequency bands. In response to the gain control values gL, gR, gF, gB, gLB, and gRB for each of the frequency bands, adaptive matrix 16 generates the frequency components (in each frequency bin in each such critical frequency band) of the component sequences L', R', C', Ls', and Rs'. All the subsets of each component sequence L', R', C', Ls', and Rs', each said subset in a different one of the frequency bands, optionally undergo post-processing in post-processing stage 18. The output of stage 18 undergoes frequency domain-to-time domain transformation (typically an inverse Short-Time Discrete Fourier Transform or "iSTDFT," but alternatively an inverse Modified Discrete Cosine Transform, or a transform in a Quadrature Mirror Filterbank, or another frequency domain-to-time domain transform) in frequency domain-to-time domain transform stage 20. Five discrete time domain signals (left channel output signal L', right channel output signal R', center channel output signal C', left surround channel output signal Ls', and right surround channel output signal Rs') are output from stage 20.

Thus, the FIG. 3 system converts two, time domain audio input signals (Lt, Rt) into frequency domain data in transform frequency bins for analysis and processing. The system's control path (including elements 12, 13, 14, 15, and 17 shown in FIG. 3) generates power measurements for each of a set of critical frequency bands from the frequency domain data and uses them to generate gain control values for configuring adaptive matrix 16. The elements of the FIG. 3 system other than those in the control path are sometimes referred to herein as the "signal path." The system's control path shapes the frequency domain data by band-pass filtering the frequency domain data in filters 12 and 13. In response to the filtered frequency domain data, frequency components Ft' and Bt' are determined. Components Ft' are indicative of a summed signal Ft (referred to herein as a "front channel" or "front" signal). Components Bt' are indicative of a difference signal Bt (referred to herein as a "back channel" or "back" signal). Frequency components Ft' and Bt', along with the filtered frequency components indicative of filtered input signals Lt and Rt, are converted to critical band power values (power measurements for each of the critical frequency bands) which are used to generate the gain control values gL, gR, gF, gB, gLB, and gRB for each of the critical frequency bands.

Neither the control path nor the signal path of the FIG. 3 system contains feedback. Instead, the control path relies on analysis of a nonlinear representation of the critical band power values. Active decoding matrix 16 is steered within the critical frequency bands to generate the output channel data (comprising frequency components in each of the transform frequency bins for each of the output channels). Matrix 16 multiplies the frequency components (Lt', Rt') indicative of the two-channel input audio by the appropriate mixing matrix coefficients, and the resulting output channel frequency components undergo optional post-processing in stage 18 and are then converted back to the time domain in stage 20.

In preferred embodiments, the gain control values for active matrix 16 (for each block of input frequency components) are determined using power ratios (e.g., the pairs of power ratios generated by elements 37 and 57 of the circuitry to be described with reference to FIGS. 5 and 6) that are shaped in non-linear fashion (e.g., in circuitry 38 and 58 of FIGS. 5 and 6) and optionally, scaled (e.g., in circuitry in circuitry 38 and 58 of FIGS. 5 and 6) and smoothed (e.g., in elements 33, 43, 45, 46, 53, 63, 65, and 66 of FIGS. 5 and 6). Power ratios for each block of input frequency components are generated for each of the critical frequency bands. The critical frequency bands divide the steering into frequency regions that are based on psychoacoustics. By doing this, the steering has greater frequency selectivity without perceptual artifacts. Consequently, the active matrix is steered using critical frequency bands rather than the transform bins.

In a typical implementation of the FIG. 3 system, transform circuits 10 and 11 convert the discrete, input audio (Lt, Rt) samples from the time domain to the frequency domain by applying, to each set of m consecutive blocks of samples of each of input signals Lt and Rt, a Short-Time Discrete Fourier Transform (STDFT), with k frequency bins and b critical frequency bands. Typically, there is overlap (e.g., 50% overlap) between each two consecutive blocks of each such set of input audio samples. Typically, b is an integer in the range from 20 to 40. Typically, each block of the input audio transformed by each of circuits 10 and 11 consists of 1024 (or 512) samples of the input audio. Also typically, the output of each of circuits 10 and 11 in response to each such block is a set of frequency components in 512 (or 256) bins (i.e., a set of frequency components each having a different one of 512 or 256 frequencies).

Figure 4:
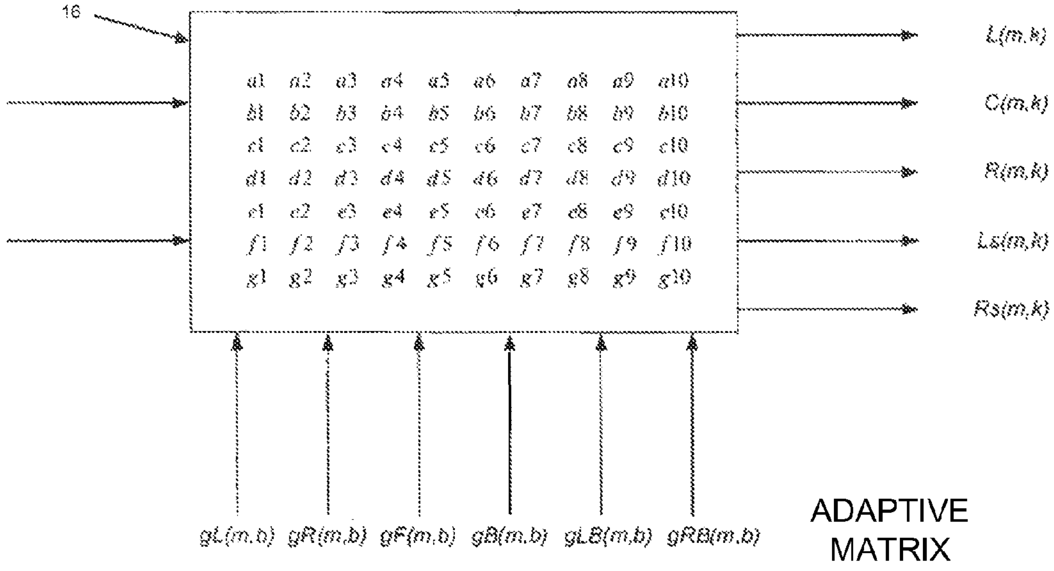
FIG. 4 is a block diagram of an implementation of adaptive matrix 16 of the decoder of FIG. 3.

Active matrix 16 of FIG. 3 is configured to perform matrix multiplication on the input frequency coefficients in each critical frequency band, using b sets of matrix coefficients, each set of matrix coefficients for a different one of the b critical frequency bands. Each set of matrix coefficients (for a critical frequency band) may consist of seventy coefficients labeled as shown in FIG. 4. In variations on the embodiment of FIGS. 3 and 4 that are configured to assert more than five output channels in response to two input channels, each set of matrix coefficients employed by the active matrix for each critical frequency band would typically consist of more than seventy coefficients.

Active matrix 16 is typically configured to apply a different set of matrix coefficients to frequency components of the input audio whose transform frequency bins are within each different critical frequency band. The frequency components (of each block of the input frequency components) in each transform frequency bin that belongs to one of the critical frequency bands are matrix multiplied by the matrix coefficients for the critical frequency band corresponding to that critical frequency band.

The matrix applied by element 16 for each of the critical frequency bands contains a fixed part (determined by matrix coefficients a1 through a10 of FIG. 4) and a variable part (determined by coefficients b1 through g10 of FIG. 4 and the gain control values asserted to matrix 16 by element 17). The fixed part of each matrix is independent of the gain control values asserted to matrix 16. The variable part of each matrix is dependent on the gain control values. For each block m and critical frequency band b, steering element 17 generates a set of gain control values gL, gR, gF, gB, gLB, and gRB, and these gain control values are applied to the bth set of matrix coefficients (the matrix coefficients of matrix 16 for the bth critical frequency band) to calculate mixing matrix values v1, . . . , v10 for the bth critical frequency band, as shown in Equation 1:

$$\begin{bmatrix} v1 \\ v2 \\ v3 \\ v4 \\ v5 \\ v6 \\ v7 \\ v8 \\ v9 \\ v10 \end{bmatrix} = [1 \quad gL \quad gR \quad gF \quad gB \quad gLB \quad gRB] \times \begin{bmatrix} a1 & a2 & a3 & a4 & a5 & a6 & a7 & a8 & a9 & a10 \\ b1 & b2 & b3 & b4 & b5 & b6 & b7 & b8 & b9 & b10 \\ c1 & c2 & c3 & c4 & c5 & c6 & c7 & c8 & c9 & c10 \\ d1 & d2 & d3 & d4 & d5 & d6 & d7 & d8 & d9 & d10 \\ e1 & e2 & e3 & e4 & e5 & e6 & e7 & e8 & e9 & e10 \\ f1 & f2 & f3 & f4 & f5 & f6 & f7 & f8 & f9 & f10 \\ g1 & g2 & g3 & g4 & g5 & g6 & g7 & g8 & g9 & g10 \end{bmatrix} \quad (1)$$

Any of a variety of suitable choices of the matrix coefficients (a1, b1, c1, . . . , and g10) for each critical frequency band will be apparent to those of ordinary skill in the art. Typically, the matrix coefficients will be chosen so that the matrices (for the critical frequency bands having relatively high frequency) are more diffuse to diffuse the higher frequency sounds, and the matrices (for the relatively low frequency critical frequency bands) localize the lower frequency sounds more (e.g., so that the output signals generated by the system, when reproduced by speakers, can "pan" low frequency sounds from location to location around the listener).

To generate the frequency components L', R', C', Ls', and Rs' for each block (the mth block) and each critical frequency band (the bth frequency band), the input signal coefficients (Lt', Rt') in the frequency band are matrix multiplied with a two row, five column matrix (whose coefficients are the mixing matrix values v1, . . . , v10 from Equation 1 for the frequency band) as shown in Equation 2:

$$\begin{bmatrix} L' \\ C' \\ R' \\ Ls' \\ Rs' \end{bmatrix} = [Lt' \quad Rt'] \begin{bmatrix} v1 & v3 & v5 & v7 & v9 \\ v2 & v4 & v6 & v8 & v10 \end{bmatrix} \quad (2)$$

In some implementations of the inventive system, a post-processing stage (e.g., post-processing stage 18 of FIG. 3) provides at least some of the following user controllable features: filtering of some or all of the output audio channels in a dependent or independent fashion; mixing of some or all of the output audio channels with one another, or with external sources; combination of audio channels in order to reduce the total number of output channels; expansion of the total number of output channels by duplicating one or more output channels; and phase inversion of one or more of the output audio channels to compensate for down-mix variations. Thus, although post-processing stage 18 as shown in FIG. 3 has five input channels and five output channels, in other implementations of the inventive system it has more than or less than five output channels. In other implementations of the inventive system, post-processing stage is omitted and the frequency components output from the active matrix (e.g., matrix 16) are passed through to the system's outputs, or directly to a frequency domain-to-time domain transform stage (e.g., stage 20).

In some embodiments, the inventive system includes circuitry configured to apply an adjustable gain to each critical frequency band (e.g., a different, independently adjustable gain to each frequency band) of each output channel. For example, stage 18 could include such gain adjustment circuitry.

Figure 5:
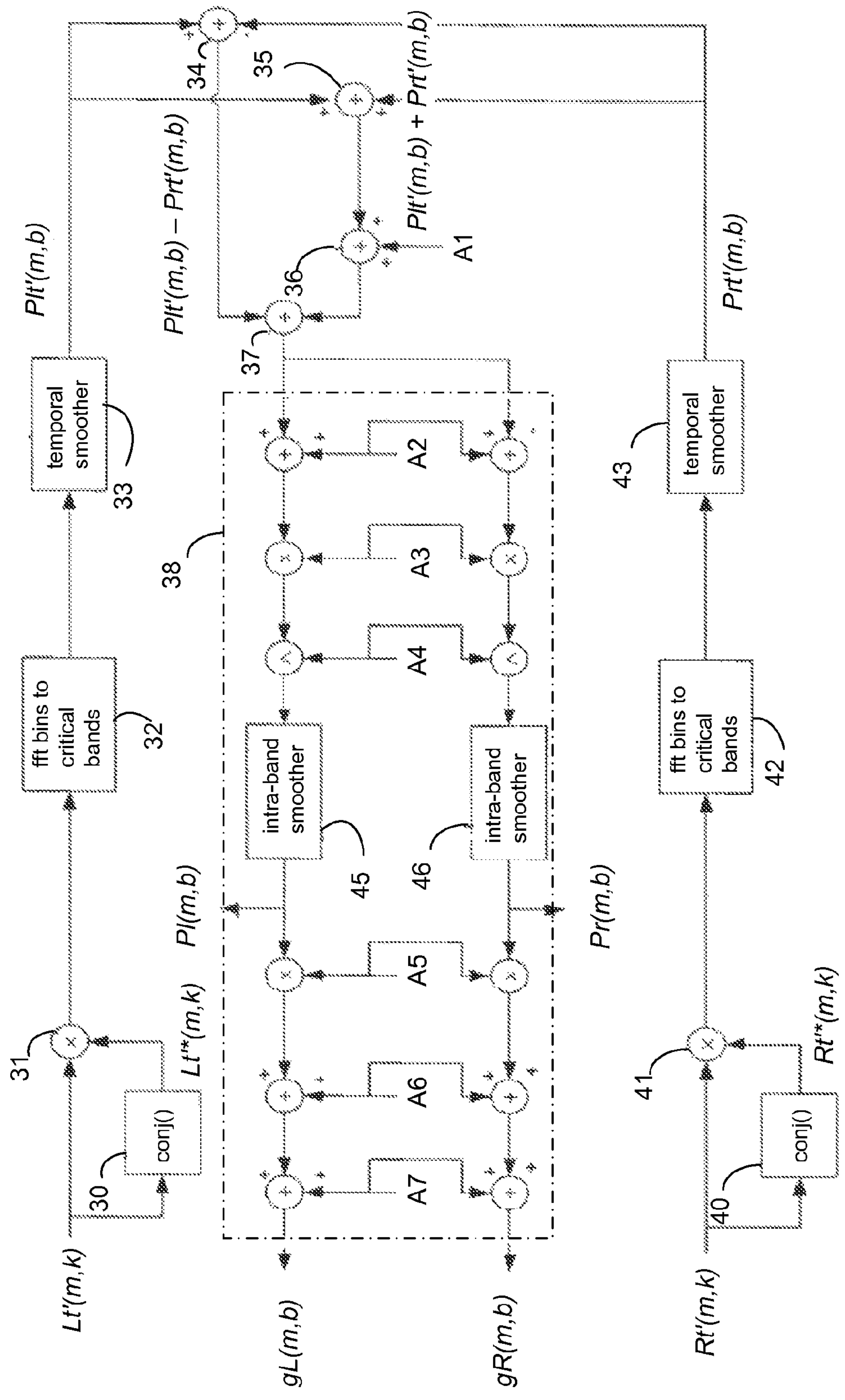
FIG. 5 is a block diagram of an implementation of left/right control circuitry of element 17 of FIG. 3.
Figure 6:
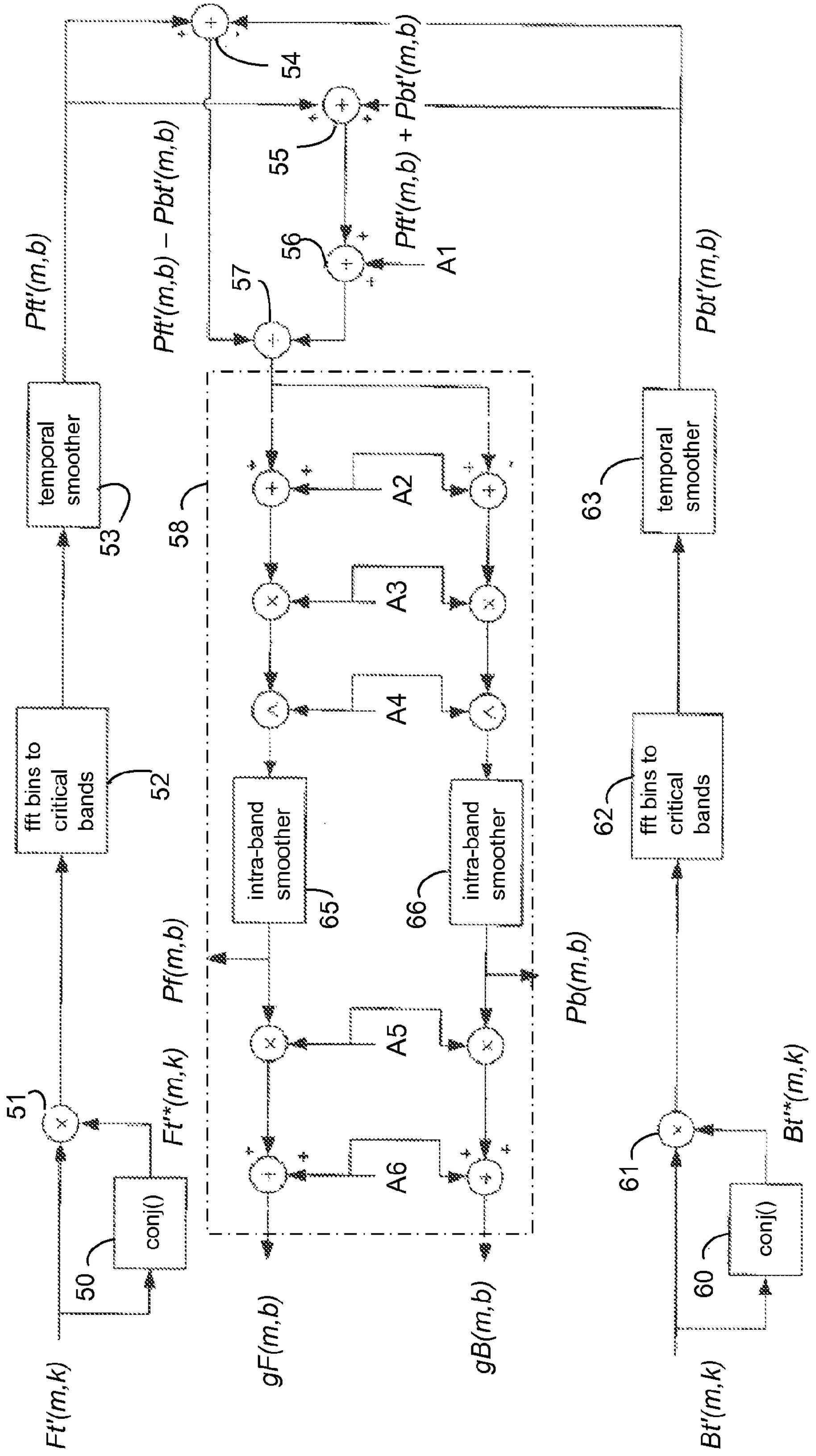
FIG. 6 is a block diagram of an implementation of front/back control circuitry of element 17 of FIG. 3.
Figure 7:
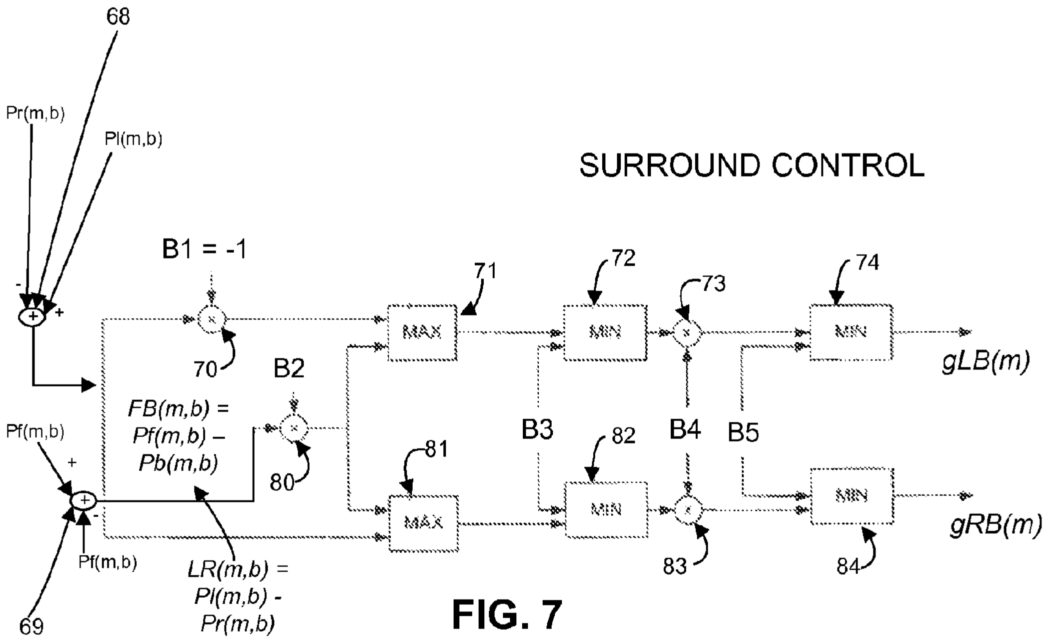
FIG. 7 is a block diagram of an implementation of surround control circuitry of element 17 of FIG. 3.

Steering element 17 of FIG. 3 includes three subsystems: left/right control circuitry as shown in FIG. 5; front/back control circuitry as shown in FIG. 6; and surround control circuitry as shown in FIG. 7.

The left/right control circuitry of FIG. 5 includes conjugation elements 30 and 40, multiplication elements 31 and 41, banding elements 32 and 42, smoothing elements 33 and 43, subtraction element 34, addition elements 35 and 36, division element 37, and shaping, smoothing, and scaling circuitry 38, connected as shown, and operates as follows. The complex conjugates of the filtered frequency components Lt' and Rt' (from filters 12 and 13 of FIG. 3) are generated in elements 30 and 40. The filtered frequency components Lt' and Rt' output from elements 30 and 40 are multiplied by their respective complex conjugates in elements 31 and 41 respectively to obtain a power measurement on a per-bin basis.

The FIG. 3 system combines the frequency components in each of the k transform bins (typically k=512 or k=256) into components in a smaller number b of critical frequency bands (e.g., b=20 bands or b=40 bands). Typically, each block of the input audio transformed by each of circuits 10 and 11 consists of 1024 (or 512) samples of the input audio, and the output of each of circuits 10 and 11 in response to each such block is a set of frequency components in 512 (or 256) bins.

Element 32 combines the power measurements output from element 31 (for each of the frequency bins) into power measurements for each of a set of critical frequency bands (e.g., on a critical or auditory-filter scale). Element 42 combines the power measurements output from element 41 (for each of the frequency bins) into power measurements for each of the critical frequency bands. Dividing the bins into critical frequency bands preferably mimics the human auditory system, specifically the cochlea. Each of elements 32 and 42 weights the power measurements in the frequency bins by applying an appropriate filter thereto (for each of the critical frequency bands) and generates the power measurement for each of the critical frequency bands by summing the weighted power measurements determined by the filter for said band.

Figure 8:
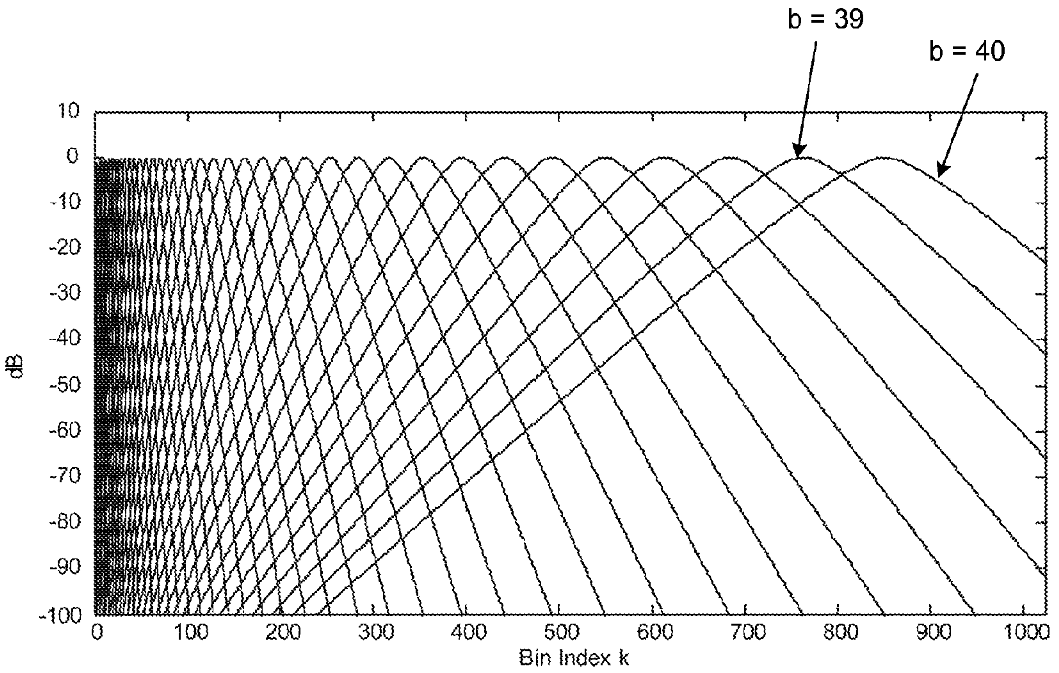
FIG. 8 is a graph of filters employed in an implementation of the FIG. 3 decoder (e.g., in elements 32 and 42 of FIG. 5) to group frequency components in k=1024 Fourier transform bins into b=40 critical frequency bands of filtered frequency components.

Typically, a different filter is applied for each critical frequency band, and these filters exhibit an approximately rounded exponential shape and are spaced uniformly on the Equivalent Rectangular Bandwidth (ERB) scale. The ERB scale is a measure used in psychoacoustics that approximates the bandwidth and spacing of auditory filters. FIG. 8 depicts a suitable set of filters with a spacing of one ERB, resulting in a total of 40 critical frequency bands, b, for application to power measurements in each of 1024 frequency bins, k. Banding the power measurements into critical frequency bands helps eliminate audible artifacts in the output data that could otherwise occur if the system worked on a per-bin basis.

The critically banded power measurements are then smoothed (in elements 33 and 43) with respect to time (i.e., across adjacent blocks) to generate in element 33 a smoothed power measurement Plt'(m,b) for each block m and critical frequency band b, and in element 43 a smoothed power measurement Prt'(m,b) for each block m and critical frequency band b.

Thus, for each block of input frequency components Lt', element 32 converts the frequency components in the k frequency bins to b critical band power measurements, Plt', one for each critical frequency band. Similarly, for each block of input frequency components Rt', element 42 converts the frequency components in the k frequency bins to b critical band power measurements, one for each critical frequency band. The power measurements Plt' are smoothed using single pole smoothing element 33 with an appropriate time-constant with respect to the DFT block size, m, and the band number, b. The power measurements Prt' are smoothed using single pole smoothing element 43 with an appropriate time-constant with respect to the DFT block size, m, and the band number, b. The smoothing of power measurements Prt' and Plt' in elements 33 and 43 smooths the power ratios asserted at the output of element 37. In alternative embodiments of the invention, the power ratios employed to generate the gain control values for steering the active matrix are smoothed in other ways.

Next, for each block of input frequency components and each critical frequency band, the sum (Plt'+Prt') of the power measurements is generated in element 35, and the difference (Plt'−Prt') of the power measurements is generated in element 34. In element 36, a small offset A1 is added to each sum (Plt'+Prt') to avoid error in division. In element 37, each difference (Plt'−Prt') is divided by the sum (Plt'+Prt'+A1) for the same band and block to obtain a normalized power ratio. The normalized power ratio is thus a ratio of left and right channel power measurements. Signals indicative of the power ratios determined in element 37 (for each block and critical frequency band) are asserted to circuit 38.

Circuit 38 performs scaling and shaping on the power ratios determined in element 37. Circuit 38 includes two branches, each including six stages. The first branch generates the gain control value gL(m, b) for each critical frequency band and block. The second branch generates the gain control value gR(m, b) for each critical frequency band and block. The first stage of the first branch adds a small offset value A2 to each power ratio. The first stage of the second branch subtracts each power value from the offset value A2. The second stage of the first branch multiplies the output of the first stage of the first branch by coefficient A3, and the second stage of the second branch multiplies the output of the first stage of the second branch by the same coefficient A3. The third stage of the first branch exponentiates each output value, X(m, b), of the second stage of the first branch to generate the value $X^{A4}$(m, b)=Pl(m, b). Typically, the coefficient A4 is equal to 3 (or a number substantially equal to 3). In the case that A4=3, the third stage of the first branch exponentiates each value X(m, b) by multiplying X(m, b) by itself and multiplying the product by X(m, b). The values output from the third stage of the first branch are smoothed in a critical frequency band-to-band fashion, in intra-band smoothing element 45, in order to keep adjacent bands from differing by large amounts. The third stage of the second branch exponentiates each output value, Y(m, b), of the second stage of the second branch to generate the value $Y^{A4}$(m, b)=Pr(m, b). The values output from the third stage of the second branch are smoothed in a critical frequency band-to-band fashion, in intra-band smoothing element 46, in order to keep adjacent bands from differing by large amounts. Signals indicative of the resulting values, Pl(m, b) and Pr(m, b), are passed to the surround control circuit of FIG. 7. Thus, the third stage modifies the output values from the second stage by the nonlinearity, A4, thereby shaping the power ratios (element 37) in nonlinear fashion.

The fourth stage of the first branch multiplies the output of the third stage of the first branch by the coefficient A5, and the fourth stage of the second branch multiplies the output of the third stage of the second branch by the same coefficient A5. The fifth stage of the first branch adds an offset value A6 to the output of the fourth stage of the first branch, and the fifth stage of the second branch adds the same offset value A6 to the output of the fourth stage of the second branch. The sixth stage of the first branch adds an offset value A7 to the output of the fifth stage of the first branch to generate the gain control value gL(m, b) for each critical frequency band and block. The sixth stage of the second branch adds the same offset value A7 to the output of the fifth stage of the second branch to generate the gain control value gR(m, b) for each critical frequency band and block.

Thus, circuit 38 scales, smooths, and shapes the power ratios, without use of feedback. More generally, the FIG. 5 circuitry generates the gain control values gL(m, b) and gR(m, b) from the input frequency components without use of feedback. The gain control values gL(m, b) and gR(m, b) are asserted to matrix 16.

In a preferred embodiment of the FIG. 5 circuit, the values A1, A2, A3, A4, A5, and A6 are as follows for a typical frequency band: A1=0.001, A2=1.001, A3=0.499, A4=3, A5=0.95, and A6=0.01. The particular choice of values A1, A2, A3, A4, A5, and A6 for each frequency band preferably depends on the frequency band for which they are applied, in a manner that will be apparent to those of ordinary skill in the art given the present description.

The front/back control circuitry of FIG. 6 includes conjugation elements 50 and 60, multiplication elements 51 and 61, banding elements 52 and 62, smoothing elements 53 and 63, subtraction element 54, addition elements 55 and 56, division element 57, and shaping and scaling circuitry 58, connected as shown, and operates as follows. The complex conjugates of the filtered frequency components Ft' and Bt' (from elements 14 and 15 of FIG. 3) are generated in elements 50 and 60. The filtered frequency components Ft' and Bt' output from elements 50 and 60 are multiplied by their respective complex conjugates in elements 51 and 61 respectively to obtain a power measurement on a per-bin basis.

Element 52 combines the power measurements output from element 51 (for each of the frequency bins) into power measurements for each of a set of critical frequency bands (e.g., on a critical or auditory-filter scale). Element 62 combines the power measurements output from element 61 (for each of the frequency bins) into power measurements for each of the critical frequency bands. Each of elements 52 and 62 weights the power measurements in the frequency bins by applying an appropriate filter thereto (for each of the critical frequency bands) and generates the power measurement for each of the critical frequency bands by summing the weighted power measurements determined by the filter for said band. Typically, a different filter is applied for each critical frequency band, and these filters are the same as those applied by above-described elements 32 and 42 of FIG. 5.

The critically banded power measurements are then smoothed (in elements 53 and 63) with respect to time (i.e., across adjacent blocks) to generate in element 53 a smoothed power measurement Pft'(m,b) for each block m and critical frequency band b, and in element 63 a smoothed power measurement Pbt'(m,b) for each block m and critical frequency band b.

Thus, for each block of frequency components Ft', element 52 converts the frequency components in the k frequency bins to b critical band power measurements, Pft', one for each critical frequency band. For each block of frequency components Bt', element 62 converts the frequency components in the k frequency bins to b critical band power measurements, Pbt', one for each critical frequency band. The power measurements Pft' are smoothed using single pole smoothing element 53 with an appropriate time-constant with respect to the DFT block size, m. The power measurements Pbt' are smoothed using single pole smoothing element 63 with an appropriate time-constant with respect to the DFT block size, m. The smoothing of power measurements Pbt' and Pft' in elements 53 and 63 smooths the power ratios asserted at the output of element 57. In alternative embodiments of the invention, the power ratios employed to generate the gain control values for steering the active matrix are smoothed in other ways.

Next, for each block of input frequency components and each critical frequency band, the sum (Pft'+Pbt') of the power measurements is generated in element 55, and the difference (Pft'−Pbt') of the power measurements is generated in element 54. In element 56, a small offset A1 is added to each sum (Pft'+Pbt') to avoid error in division. In element 57, each difference (Pft'−Pbt') is divided by the sum (Pft'+Pbt'+A1) for the same band and block to obtain a normalized power ratio. The normalized power ratio is thus a ratio of front and back channel power measurements. Signals indicative of the power ratios determined in element 57 (for each block and critical frequency band) are asserted to circuit 58.

Circuit 58 performs scaling, smoothing, and shaping on the sequence of power ratios determined in element 57. Circuit 58 includes two branches, each including six stages. The first branch generates the gain control value gF(m, b) for each critical frequency band and block. The second branch generates the gain control value gB(m, b) for each critical frequency band and block. The first stage of the first branch adds a small offset value A2 to each power ratio. The first stage of the second branch subtracts each power value from the offset value A2. The second stage of the first branch multiplies the output of the first stage of the first branch by coefficient A3, and the second stage of the second branch multiplies the output of the first stage of the second branch by the same coefficient A3. The third stage of the first branch exponentiates each output value, X(m, b), of the second stage of the first branch to generate the value $X^{A4}(m, b)=Pf(m, b)$. Typically, the coefficient A4 is equal to 3 (or a number substantially equal to 3). In the case that A4=3, the third stage of the first branch exponentiates each value X(m, b) by multiplying X(m, b) by itself and multiplying the product by X(m, b). The values output from the third stage of the first branch are smoothed in a critical frequency band-to-band fashion, in intra-band smoothing element 65, in order to keep adjacent bands from differing by large amounts. The third stage of the second branch exponentiates each output value, Y(m, b), of the second stage of the second branch to generate the value $Y^{A4}(m, b)=Pb(m, b)$. The values output from the third stage of the second branch are smoothed in a critical frequency band-to-band fashion, in intra-band smoothing element 66, in order to keep adjacent bands from differing by large amounts. Signals indicative of the resulting values, Pf(m, b) and Pb(m, b), are passed to the Surround control circuit of FIG. 7. Thus, the third stage modifies the output values from the second stage by the nonlinearity, A4, thereby shaping the power ratios (element 57) in nonlinear fashion.

The fourth stage of the first branch multiplies the output of the third stage of the first branch by the coefficient A5, and the fourth stage of the second branch multiplies the output of the third stage of the second branch by the same coefficient A5. The fifth stage of the first branch adds an offset value A6 to the output of the fourth stage of the first branch to generate the gain control value gF(m, b) for each critical frequency band and block. The fifth stage of the second branch adds the same offset value A6 to the output of the fourth stage of the second branch to generate the gain control value gB(m, b) for each critical frequency band and block. Thus, circuit 58 merely scales and shapes the power ratios, without use of feedback. More generally, the FIG. 6 circuitry generates the gain control values gF(m,b) and gB(m, b) from the input frequency components without use of feedback. The gain control values gF(m, b) and gB(m, b) are asserted to matrix 16.

In a preferred embodiment of the FIG. 6 circuit, the values A1, A2, A3, A4, A5, and A6 are as follows for a typical frequency band: A1=0.001, A2=1.001, A3=0.499, A4=3, A5=0.95, and A6=0.01. The particular choice of values A1, A2, A3, A4, A5, and A6 for each frequency band preferably depends on the frequency band for which they are applied, in a manner that will be apparent to those of ordinary skill in the art given the present description.

The surround control circuitry of FIG. 7 generates the gain control values gLB(m, b) and gRB(m, b) in response to the Pl(m,b), Pr(m,b), Pf(m,b), and Pb(m,b) values from the circuits of FIG. 5 and FIG. 6. The circuitry of FIG. 7 includes subtraction elements 68 and 69, multiplication elements 70, 73, 80, and 83, and comparison elements 71, 72, 74, 81, 82, and 84, connected as shown. In operation, element 68 outputs a difference value LR(m,b)=Pl(m,b)−Pr(m,b), in response to values Pl(m,b) and Pr(m,b) for each block and critical frequency band, and element 69 outputs a difference value FB(m,b)=Pf(m,b)−Pb(m,b), in response to values Pf(m,b) and Pb(m,b) for each block and critical frequency band.

In the left-back (gLB) path, each value LR(m,b) is inverted in element 70 (it is multiplied in element 70 by the value B1=−1). In the right-back (gRB) path, each value FB(m,b) is multiplied in element 80 by the value B2).

In the left-back path, comparison element 71 outputs the greater of (maximum of) the current inverted LR(m,b) and FB(m,b) values, and comparison element 72 outputs the smaller of (minimum of) the output of element 71 and constant B3. Element 73 scales the output of element 72 by multiplying it by the constant B4. Comparison element 74 outputs the smaller of (minimum of) the output of constant B5 and the scaled output of element 73. The output of element 74 is the gain control value gLB(m, b) for the current block and critical frequency band. A sequence of gain control values gLB(m, b) is asserted from the output of element 74 to element 16, one for each block and critical frequency band.

In the right-back path, comparison element 81 outputs the greater of (maximum of) the current LR(m,b) value and the current inverted FB(m,b) value, and comparison element 82 outputs the smaller of (minimum of) the output of element 81 and the constant B3. Element 83 scales the output of element 82 by multiplying it by the constant B4. Comparison element 84 outputs the smaller of (minimum of) the output of the constant B5 and the scaled output of element 83. The output of element 84 is the gain control value gLB(m, b) for the current block and critical frequency band. A sequence of gain control values gRB(m, b) is asserted from the output of element 84 to element 16, one for each block and critical frequency band.

In a preferred embodiment of the FIG. 7 circuit, the values B1, B2, B3, B4, and B5 are as follows for a typical frequency band: B1=−1, B2=0.61, B3=0.0, B4=−2.1, and B5=0.99. The particular choice of values B1, B2, B3, B4, and B5 for each frequency band preferably depends on the frequency band for which they are applied, in a manner that will be apparent to those of ordinary skill in the art given the present description.

In another class of embodiments, the invention is a matrix decoding method for decoding N audio input signals to determine M audio output signals (typically, full-frequency output channels), where M is greater than N, said method including the steps of:

(a) operating an active matrix subsystem to generate M streams of output frequency components which determine the M audio output signals, in response to N streams of input frequency components indicative of the N audio input signals;

(b) determining power ratios from the input frequency components without use of feedback, said power ratios including at least one power ratio for each critical frequency band in a set of critical frequency bands;

(c) determining gain control values for each of the critical frequency bands from the power ratios including by shaping the power ratios in nonlinear fashion without use of feedback; and (d) while performing step (a), steering the active matrix element using the gain control values.

In some embodiments, step (c) includes the step of scaling and smoothing the power ratios without use of feedback. Typically, N=2, M=5, step (b) includes the step of determining two power ratios (for each block of the input frequency coefficients) for each of the critical frequency bands, and step (c) includes the step of determining five gain control values (for each block of the input frequency coefficients) for each of the critical frequency bands. In some embodiments, the method also includes at least one of the steps of: transforming the audio input signals from the time domain into the frequency domain to generate the streams of input frequency components; and transforming the streams of output frequency components from the frequency domain into the time domain, thereby generating the M audio output signals.

Figure 9:
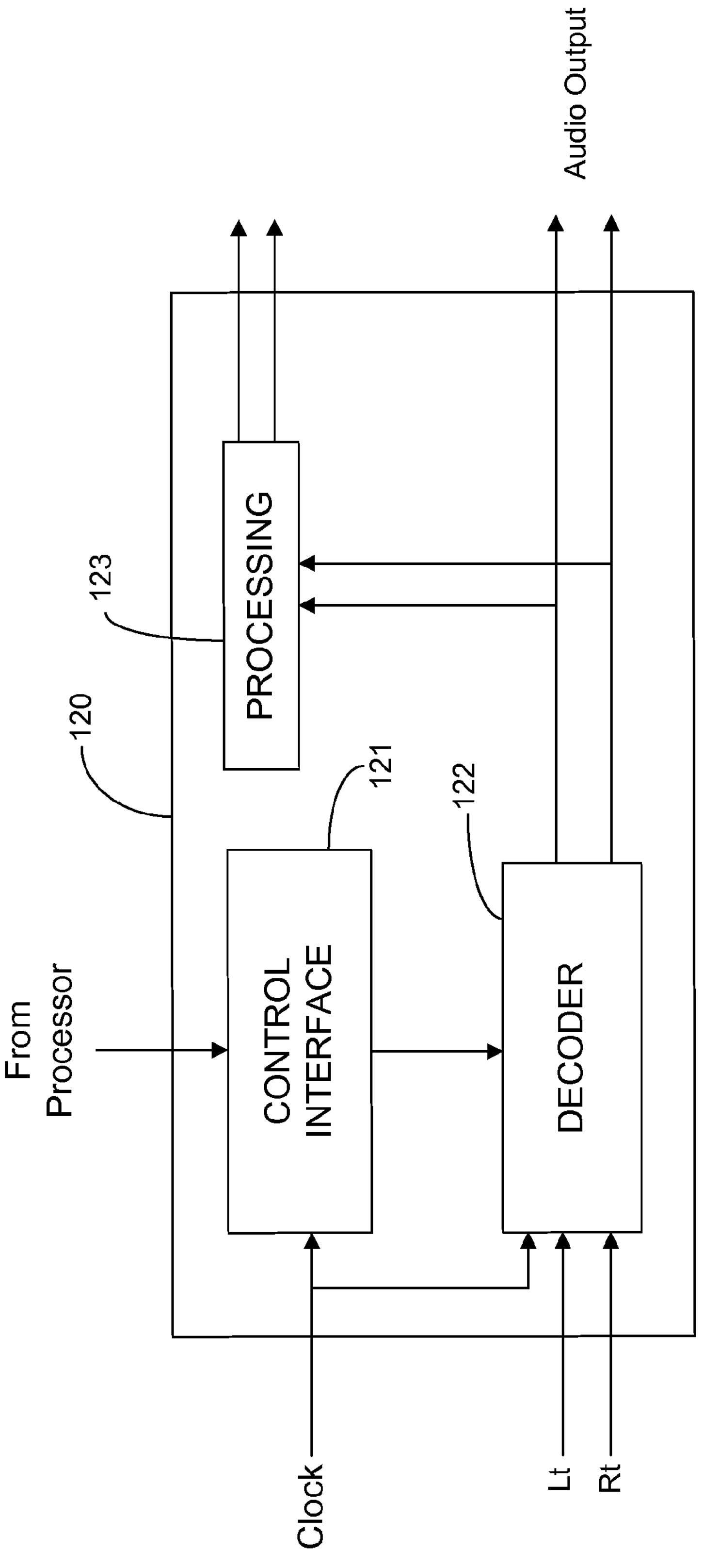
FIG. 9 is a block diagram of an audio digital signal processor (DSP) that is an embodiment of the inventive decoding system.

FIG. 9 is a block diagram of a decoding system (a decoder) 120, which is a programmable audio DSP that has been configured to perform an embodiment of the inventive method. System 120 includes programmable DSP circuitry 122 (an active matrix decoder subsystem of system 120) coupled to receive audio input signals (e.g., two input signals Lt and Rt of the type described with reference to FIG. 3). Circuitry 122 is configured in response to control data from control interface 121 to perform an embodiment of the inventive method, to generate multiple output audio signals (e.g., left output "L," right output "R," center output "C," left surround output "Ls," and right surround output "Rs" of the type generated by the FIG. 3 system) in response to the audio input signals. To program system 120, appropriate software is asserted from an external processor to control interface 121, and interface 121 asserts in response appropriate control data to circuitry 122 to configure the circuitry 122 to perform the inventive method.

In operation, an audio DSP that has been configured to perform active matrix decoding in accordance with the invention (e.g., system 120 of FIG. 9) is coupled to receive N audio input signals, and the DSP typically performs a variety of operations on the input audio (or a processed version thereof) in addition to (as well as) decoding. For example, system 120 of FIG. 9 may be implemented to perform other operations (on the output of circuitry 122) in processing subsystem 123. In accordance with various embodiments of the invention, an audio DSP is operable to perform an embodiment of the inventive method after being configured (e.g., programmed) to generate output audio signals in response to input audio signals by performing the method on the input audio signals.

In some embodiments, the inventive system is or includes a general purpose processor coupled to receive or to generate input data indicative of multiple audio input channels, and programmed with software (or firmware) and/or otherwise configured (e.g., in response to control data) to perform any of a variety of operations on the input data, including an embodiment of the inventive method. Such a general purpose processor would typically be coupled to an input device (e.g., a mouse and/or a keyboard), a memory, and a display device. For example, the FIG. 3 system could be implemented in a general purpose processor, with inputs Lt and Rt being data indicative of encoded left and right audio input channels, and outputs L, C, R, Ls, and Rs being output data indicative of decoded output audio signals. A conventional digital-to-analog converter (DAC) could operate on this output data to generate analog versions of the output audio signals for reproduction by physical speakers.

While specific embodiments of the present invention and applications of the invention have been described herein, it will be apparent to those of ordinary skill in the art that many variations on the embodiments and applications described herein are possible without departing from the scope of the invention described and claimed herein. It should be understood that while certain forms of the invention have been shown and described, the invention is not to be limited to the specific embodiments described and shown or the specific methods described.

What is claimed is:

1. A matrix decoding method for decoding N audio input signals to determine M audio output signals, where M and N are integers and M is greater than N, and N=2, said method including the steps of:

transforming (10, 11) the N audio input signals from the time domain into the frequency domain to generate N streams of input frequency components;

determining power ratios (17, 30, 31, 32, 33) from the streams of input frequency components, said power ratios including at least one power ratio for each critical frequency band in a set of critical frequency bands, wherein the set of critical frequency bands is determined in accordance with perceptually motivated considerations;

determining gain control values (17, 38) for each of the critical frequency bands from the power ratios including by shaping the power ratios in a nonlinear fashion, wherein the shaping of the power ratios in nonlinear fashion includes a step of exponentiating at least one value determined from at least one of the power ratios with an exponent at least substantially equal to three;

operating an active matrix subsystem (16) to generate M streams of output frequency components in response to the streams of input frequency components; wherein the active matrix subsystem (16) is steered using the gain control values; wherein the active matrix subsystem (16) applies multiple sets of matrix coefficients to the streams of input frequency components, each set of matrix coefficients for a different one of the critical frequency bands; and transforming (20) the streams of output frequency components from the frequency domain into the time domain, thereby generating the M audio output signals.

2. The method of claim 1, wherein the step of determining power ratios (17, 30, 31, 32, 33) is performed without use of feedback, and wherein the step of determining gain control values (17, 38) is performed without use of feedback.

3. The method of claim 2, wherein the step of determining gain control values (17, 38) includes the step of scaling and smoothing the power ratios without use of feedback.

4. The method of claim 3, wherein M=5, and wherein the step of determining power ratios (17, 30, 31, 32, 33) includes the step of determining two power ratios for each block of the streams of input frequency components for each of the critical frequency bands, and wherein the step of determining gain control values (17, 38) includes the step of determining five gain control values for each block of the streams of input frequency components for each of the critical frequency bands.

5. The method of claim 3, wherein M=5, and wherein the step of operating an active matrix subsystem (16) includes the step of generating five streams of output frequency components, including a left channel output stream, a right channel output stream, a center channel output stream, a right surround channel output stream, and a left surround channel output stream, and wherein the step of determining power ratios (17, 30, 31, 32, 33) includes the step of determining a pair of power ratios for each block of the streams of input frequency components for each of the critical frequency bands, each said pair of power ratios comprising a ratio of left and right channel power measurements and a ratio of front and back channel power measurements.

6. The method of claim 1, wherein M=5, and wherein the step of determining power ratios (17, 30, 31, 32, 33) includes the step of determining two power ratios for each block of the streams of input frequency components for each of the critical frequency bands, and wherein the step of determining gain control values (17, 38) includes the step of determining five gain control values for each block of the streams of input frequency components for each of the critical frequency bands.

7. The method of claim 1, wherein M=5, and wherein the step of operating an active matrix subsystem (16) includes the step of generating five streams of output frequency components, including a left channel output stream, a right channel output stream, a center channel output stream, a right surround channel output stream, and a left surround channel output stream, and wherein the step of determining power ratios (17, 30, 31, 32, 33) includes the step of determining a pair of power ratios for each block of the streams of input frequency components for each of the critical frequency bands, each said pair of power ratios comprising a ratio of left and right channel power measurements and a ratio of front and back channel power measurements.

8. The method of claim 7, wherein the steps are performed by operating an audio digital signal processor which includes the active matrix subsystem (16) and a control subsystem (17) coupled to the active matrix subsystem (16), and wherein the steps of determining power ratios (17, 30, 31, 32, 33) and of determining gain control values (17, 38) are performed by operating the control subsystem (17) to determine the power ratios from the streams of input frequency components and to determine the gain control values.

9. An active matrix decoder configured to decode N audio input signals to generate M audio output signals, where M and N are integers and M is greater than N, and N=2, said decoder including:

an input transform subsystem (10, 11) configured to transform the N input signals from the time domain to the frequency domain, thereby generating N streams of input frequency components in response to the N input signals;

a control subsystem (17) configured to generate gain control values in response to the streams of input frequency components, by generating power ratios (30, 31, 32, 33) in response to the streams of input frequency components, said power ratios including at least one power ratio for each block of the streams of input frequency components for each critical frequency band in a set of critical frequency bands; wherein the set of critical frequency bands is determined in accordance with perceptually motivated considerations; and generating the gain control values (38) from the power ratios including by shaping the power ratios in a nonlinear fashion, wherein the gain control values include subsets, each of the subsets for a different one of the critical frequency bands, and wherein the shaping of the power ratios in nonlinear fashion includes exponentiating at least one value determined from at least one of the power ratios with an exponent at least substantially equal to three;

an active matrix subsystem (16) coupled to the control subsystem (17) and configured to generate M streams of output frequency components in response to the N streams of input frequency components; wherein the control subsystem (17) is configured to assert the gain control values to the active matrix subsystem (16) for steering the active matrix subsystem (16) during generation of the M streams of output frequency components; and wherein the active matrix subsystem (16) is configured to apply multiple sets of matrix coefficients to the streams of input frequency components, each set of matrix coefficients for a different one of the critical frequency bands; and an output transform subsystem (20) configured to transform the M streams of output frequency components from the frequency domain into the time domain, thereby generating the M output signals in response to said streams of output frequency components.

10. The decoder of claim 9, wherein the control subsystem (17) is configured to generate the power ratios without use of feedback, and to generate the gain control values without use of feedback.

11. The decoder of claim 10, wherein M=5, the control subsystem (17) is configured to generate for each block of the streams of input frequency components a pair of power ratios for each critical frequency band in the set of critical frequency bands, and to generate for each block of the streams of input frequency components five gain control values for each said critical frequency band from the power ratios.

12. The decoder of claim 11, wherein said decoder is configured to decode two streams of input frequency components to generate five streams of output frequency components which determine five audio output signals, including a left channel output signal, a right channel output signal, a center channel output signal, a right surround channel output signal, and a left surround channel output signal, and each said pair of power ratios comprises a ratio of left and right channel power measurements and a ratio of front and back channel power measurements.

13. The decoder of claim 9, wherein the control subsystem (17) is configured to generate the gain control values from the power ratios including by scaling and smoothing the power ratios without use of feedback.

14. The decoder of claim 9, wherein the gain control values for each of the critical frequency bands determine a different one of the sets of matrix coefficients for application by the active matrix subsystem (16) to those of the input frequency components whose frequencies are within said each of the critical frequency bands.

15. The decoder of claim 9, wherein the gain control values for each of the critical frequency bands determine a different one of the sets of matrix coefficients for application by the active matrix subsystem (16) to those of the input frequency components whose transform frequency bins are within said each of the critical frequency bands.

16. The decoder of claim 9, wherein M=5, the control subsystem (17) is configured to generate for each block of the streams of input frequency components a pair of power ratios for each critical frequency band in the set of critical frequency bands, and to generate for each block of the streams of input frequency components five gain control values for each said critical frequency band from the power ratios.

17. The decoder of claim 16, wherein said decoder is configured to decode two streams of input frequency components to generate five streams of output frequency components which determine five audio output signals, including a left channel output signal, a right channel output signal, a center channel output signal, a right surround channel output signal, and a left surround channel output signal, and each said pair of power ratios comprises a ratio of left and right channel power measurements and a ratio of front and back channel power measurements.

18. The decoder of claim 9, wherein the decoder is an audio digital signal processor.

19. The decoder of claim 9, wherein the decoder is an audio digital signal processor including circuitry configured to implement the active matrix subsystem (16) and the control subsystem (17).

* * * * *